United States Patent

Abnett et al.

[15] 3,636,338
[45] Jan. 18, 1972

[54] CONTINUOUS FUNCTION GENERATION

[72] Inventors: Albert C. Abnett, Westerville; Jack S. Alexander, Columbus, both of Ohio

[73] Assignee: Reliance Electric Company, Columbus, Ohio

[22] Filed: July 31, 1969

[21] Appl. No.: 846,485

[52] U.S. Cl. .................................................. 235/197
[51] Int. Cl. ............................................... G06g 7/26
[58] Field of Search .................................... 235/197

[56] References Cited

OTHER PUBLICATIONS

Syllabus of Mathematics, Society for the Promotion of Engineering Education, Pittsburgh, 1914, p. 12

L. V. East et al. Simple Logarithmic DC Amplifier In Review of Scientific Instruments 31(11): p. 1222– 1225, Nov. 1960.

C. J. Savant et al. A Function Generator for the Solution of Engineering Design Problems In I.R.E. Trans. Elect. Comp. EC– 3(3): p. 34– 36, Sept. 1954

Primary Examiner—Malcolm A. Morrison
Assistant Examiner—R. Stephen Dildine, Jr.
Attorney—Le Blanc & Shur

[57] ABSTRACT

There is disclosed a method and apparatus for transforming an input signal $Y_{in}=f(x)$ into an output signal $Y_{out}=g(x)$ involving approximation of the input by a function having a plurality of terms which are functions of the independent variable, generating electrical signals representing each of the terms of the approximating function except for a designated remainder term, and subtracting the signals representing the generated terms from the input signal thereby yielding the designated remainder term, the latter being employed to generate the signals to be subtracted. In one embodiment, a circuit is provided to convert an input signal into a linear output signal in the form $Y_{out}=mx+b$. In another embodiment, a circuit is provided for converting an input signal into an output signal in power series forms. The circuits are closed loop signal processors in which the forward loop operates to subtract the terms of the approximating function from the input signal to yield the designated remaining term, and the feedback operates to convert the designated remaining term into the necessary signals for subtraction. A separate output path appropriately modifies some or all of the signals generated by the feedback and combines the modified signals to form the output.

16 Claims, 4 Drawing Figures

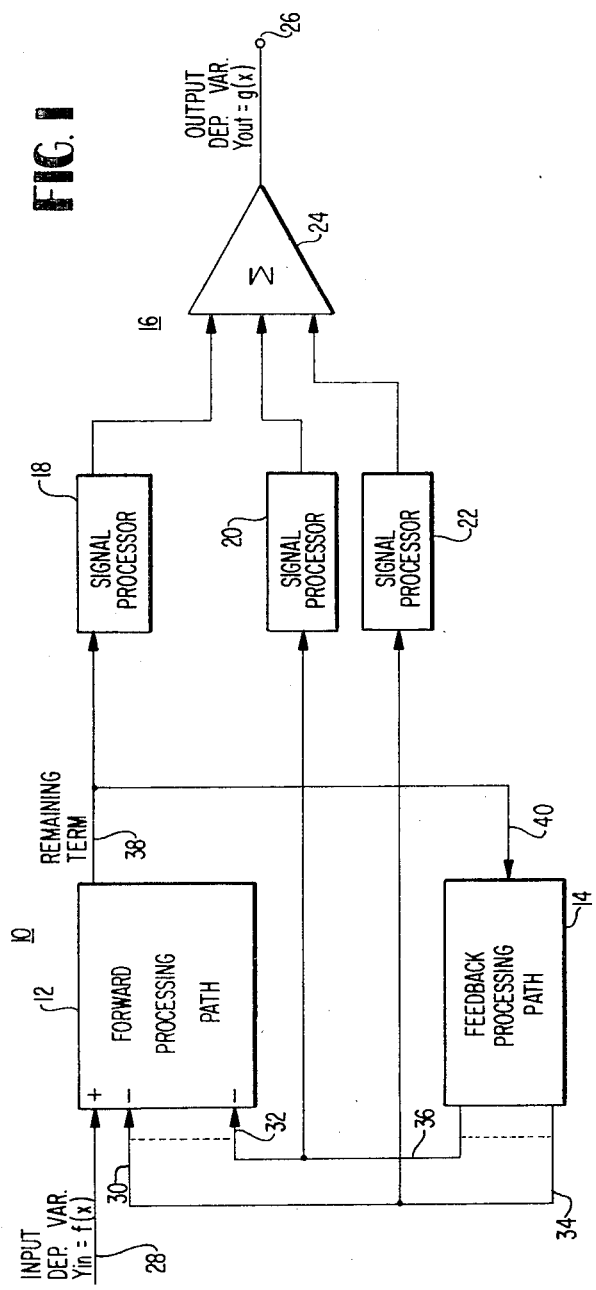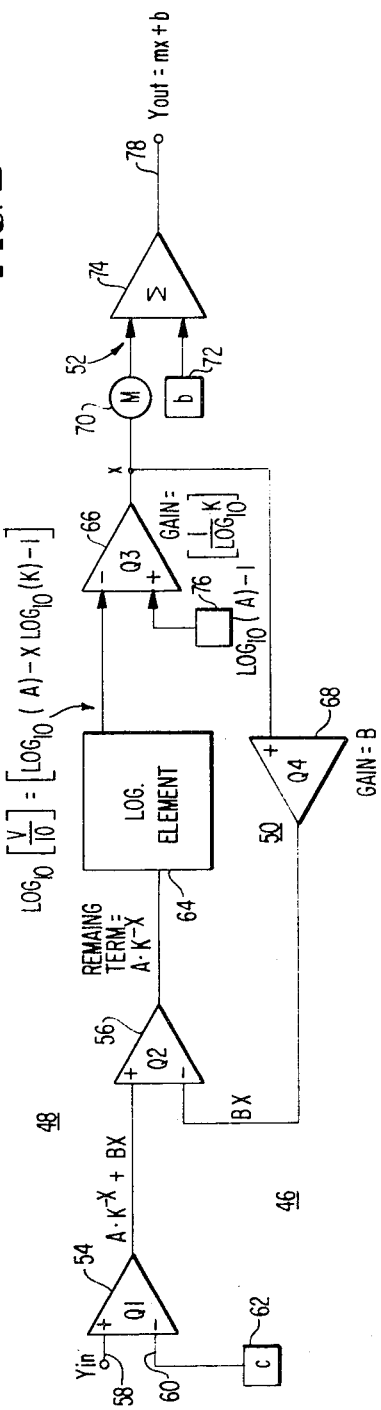

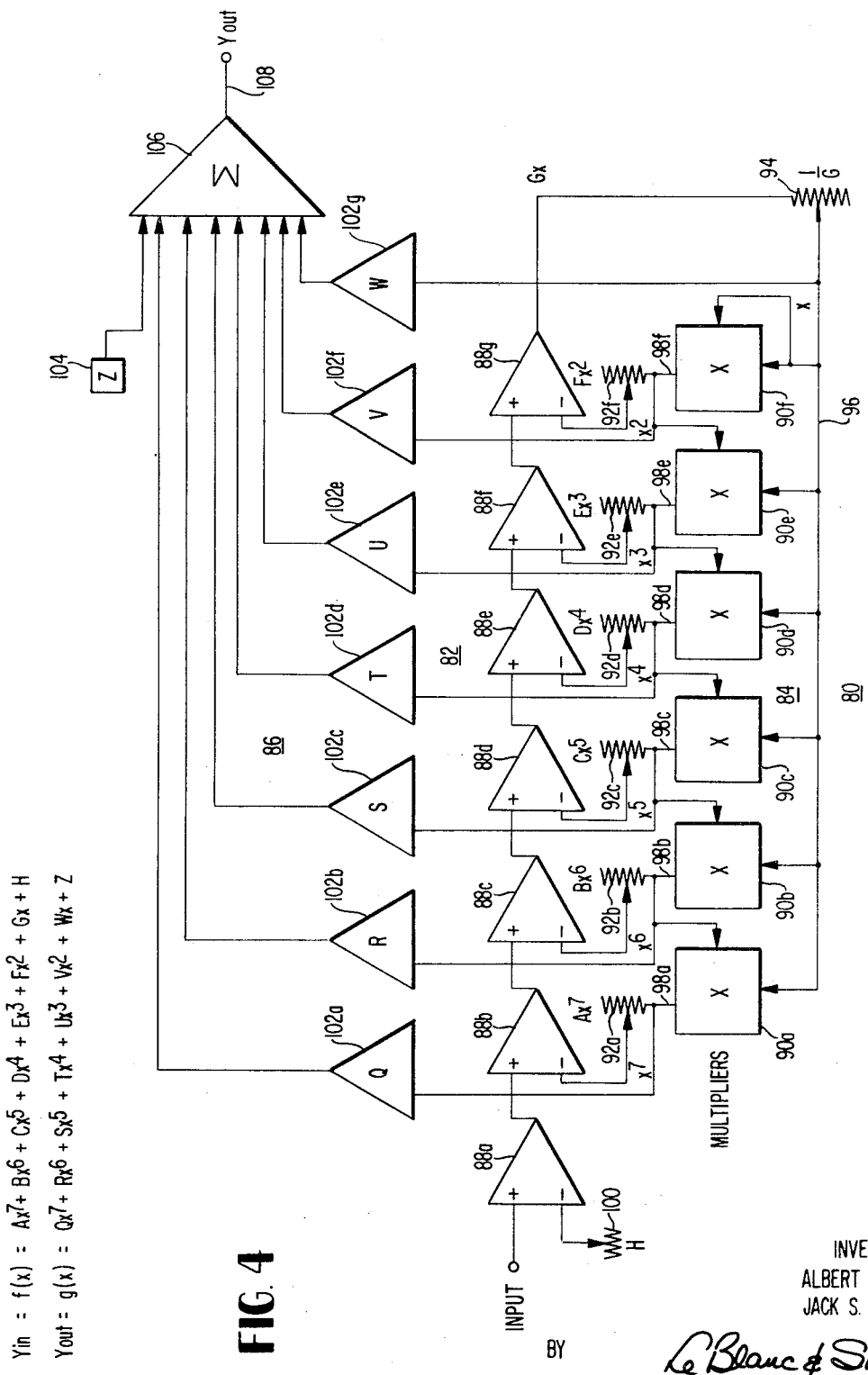

CONTINUOUS FUNCTION GENERATION

BACKGROUND AND BRIEF DESCRIPTION

The present invention relates to electronic function generation, and more particularly to apparatus and method for transforming a function $y=f(x)$ into another function $y'=(x)$ without resort to discontinuous breakpoint simulation.

The requirement for synthesis or simulation of mathematical functions frequently arises in analog or digital (or hybrid) computation, simulation of physical systems, process control, etc. For example, it is frequently necessary to generate a function $y=f(x)$ in some linear, nonlinear, or transcendental form given a varying input $x$. Another application broadly involves conversion of an input signal $y$ represented by a relationship $y=f(aJ)$ into an output signal $z$ characterized by a relationship $z=g(a0)$. A specific example of the latter is a so-called "curve straightener" which is used to transform a general function $y=f(aJ)$ into a linear function $z=ax$.

Traditionally, servo-driven potentiometers, optical or mechanical pattern followers, or piecewise linear diode networks have been employed as functions generators in analog computation and/or simulation while table look up or like techniques have been employed in digital computation and/or simulation. All of these techniques suffer from various disadvantages. Servo-driven potentiometers and mechanical pattern followers are limited in frequency response while optical pattern followers are usually costly and complex. Also, such devices are usually large and inconvenient for many applications. Another disadvantage is that a separate pattern or potentiometer is necessary for each function to be synthesized, and in many cases, for different members of a single family of functions.

Substantially greater flexibility and convenience can be achieved by utilization of diode function generators which provide a piecewise linear approximation of the curve to be synthesized. However, as will be appreciated, the accuracy of the approximation depends on the provision of a very substantial number of short linear segments, hence many diodes and associated circuitry are necessary, especially where the function to be generated or transformed is fairly complicated. In addition, adjustment of the breakpoints, and selection of the slope of each linear segment to produce a given function for different members of a family of functions can be very time consuming and tedious. Another disadvantage of diode function generators is that the resulting output signal is discontinuous. This may result in introduction of substantial inaccuracies and noise during subsequent processing of the signal, especially where differentiation is involved.

As previously mentioned, function generation finds utility in two rather broad categories; viz, curve fitting and function transformation. Since curve fitting often requires synthesis of a highly complicated function, piecewise linear approximation with resistive diode circuits represents the most satisfactory available technique. In function transformation, however, it is usually desired to transform a signal which is already characterized by a highly complicated functional relationship into an output signal characterized by a completely different and sometimes simpler functional relationship.

By way of example, in vibration measurement, one often employs noncontact transducer systems including capacitive or other energy sensitive pickups as in commonly assigned Foster U.S. Pat. No. 3,180,136. Capacitive pickups usually employed in such noncontact transducer systems are characterized by an electrical output $E_{out}$ which varies with pickup to object spacing $x$ according to the relationship:

$$E_{out}=a/x^b \quad (1)$$

where $a$ and $b$ are constants. Even when $b$ is an integer, calibration of output circuitry to accommodate such a functional relationship may be quite difficult.

On the other hand, transformation of such a relationship into a linear relationship in the form $E'_{out}=mx$ would eliminate the need for output circuit calibration.

To accomplish this with a diode function generator, it would be necessary to design a circuit having a complicated inverse transfer function whereby the resulting output would be characterized by a linear relationship. This can be done in principle, but a large number of circuit elements would be necessary to produce an accurate representation of the desired transfer function, and the resulting output function would be piecewise linear. Thus, the greater the degree of accuracy required, the greater would be the number of breakpoints or discontinuities. This in turn would increase difficulties resulting from the discontinuities.

According to the present invention, the aforementioned difficulties have been overcome and apparatus has been developed to transform electrical input signals characterized by a wide range of functional relationships into output signals characterized by other functional relationships without piecewise linear approximation. The apparatus involved is relatively simple, and is easily adjustable to accommodate a wide range of input functions. Likewise, the apparatus is readily adjustable to generate different members of a variety of families of output functions.

According to a general aspect of this invention, a desired output function $z=g(x)$ may be produced from an input function $y=f(x)$ by approximating the input function by a suitable multiple term function:

$$f^* = \sum_{n=1}^{m} A_n f_n(x) \quad (2)$$

The function $f^*$ is synthesized by a closed loop processing technique in which a signal analog of some function of the independent variable $x$, e.g., $A_n f_p(x)$ is assumed to be available as the output of the loop. This signal analog is fed back, and is appropriately processed to generate a signal analog of each term in equation (2) which includes the independent variable except for one term. The remaining term is either the term intended to define the output functional relationship, or to facilitate its convenient synthesis.

By way of example, input functions $f(x)$ of diverse types may be transformed into linear output functions in the form:

$$y_{out}=g(x)=mx+b \quad (3)$$

by approximating the function $y_{in}=f(x)$ by a function:

$$f_1^*=AK^{-x}+Bx+C \quad (4)$$

the resulting linear output function is characterized by an accuracy of at least 1 percent, i.e., the measured value of the output function differs from the desired theoretical value in more than one case out of 100.

The above-described feedback loop processing and successive termwise elimination technique may be applied to transformation of general input functions which may be represented by a power series approximation. As a specific example, if an input dependent variable $y_{in}$ can be represented by a power series:

$$y_{in} = f_2^* = \sum A_n x^n \quad (5)$$

a closed loop system can be set up with an assumed output or remaining term $K_1 x$. This may be fed back and raised to a succession of powers then multiplied by appropriate constants and subtracted in succession from the input $y_{in}$ to produce the desired remaining term. The various power terms from the feedback loop may then be multiplied by appropriate constants and collected to produce an output dependent variable:

$$y_{out} = g_2(x) = \sum B_n x^n \quad (6)$$

Briefly stated, in accordance with the first embodiment of the invention, a closed loop circuit is provided to synthesize the approximating functions $y_{in}=f^*$ in accordance with equation (4). The constants $A$, $K$, $B$, and $C$ are selected by measurement of the actual input functional relationship $y_{in}=f(z)$ for four values of $x$, viz., $X_1$ through $X_4$. The simultaneous of the equations $Y_1=f^*(X_1)$, $Y_2=(X_2)$, etc. The forward path of the loop is provided with a summing amplifier for eliminating two of the three terms in equation (4), in this instance, all but the exponential term $AK^{-x}$. The latter is converted into a linear term $x$ by a logarithmic circuit. The independent variable $x$ is then multiplied by the constant $B$ and fed back to eliminate the linear term in equation (4).

In the power series embodiment, a closed loop is provided to synthesize an input approximating function according to the relationship:

$$y_{in}=f_2^*(x)=\sum A_n x^n$$

The circuit operates to eliminate all but one term in equation (5), preferably retaining the linear term. The latter is then raised to successive powers, and each power term $x^n$ is multiplied by its associated coefficient $A_n$. The resulting products are subtracted from the input $y_{in}=f(x)$ to generate the desired remaining term. Each of the power terms $x^n$ is then multiplied by the associated coefficient $B_n$ according to equation (6), and the result summed to generate the output dependent variable $y_{out}=g_2(x)$.

Accordingly, it is an object of the present invention to provide a method and apparatus for transforming input signal $y_{in}=f(x)$ into an output signal $y_{out}=g(x)$ without resort to piecewise linear approximation. It is a more particular object of this invention to provide such a method and apparatus for converting an input signal $y_{in}=f(x)$ into an output signal $y_{out}=mx+b$. It is another particular object of this invention to provide such a method and apparatus for transforming an input signal characterized by a power series approximation into an input characterized by a different power series approximation.

It is a further object of this invention to provide a method and apparatus for transforming an input signal $y_{in}=f(x)$ into an output signal $y_{out}=g(x)$ by generating an approximation to $y_{in}$ in the form:

$$y_{in}=f_1^-(x)=AK^{-x}+Bx+C.$$

Another object of this invention is to provide a method and apparatus for transforming an input signal $y_{in}=f(x)$ into an output signal $y_{out}=g(x)$ by generating an approximation to $y_{in}$ in the form:

$$y_{in}=f_2^*(x)=\sum A_n x^n$$

A still further object of this invention is to provide method and apparatus for transforming an input signal $y_{in}=f(x)$ into an output signal $y_{out}=g(x)$ by approximating the input function by an equation having a plurality of terms involving the independent variable $(x)$, by generating each term of the approximating equation, and having means for subtracting from the input $y_{in}$ each of the generated terms except one, from which all other terms are generated.

It is another object of this invention to provide a method and apparatus for converting an input signal $y_{in}=f(x)$ which may be approximated by the equation:

$$y_{in}=f_1^-=AK^{-x}+Bx+C$$

into an output signal in the form $$g(x)=mx+b$$

by the employment of a closed loop circuit having means to generate the constant $C$ and for subtracting same from the input $y_{in}$, means for generating the linear term $Bx$ and for subtracting the same from the input, and means for converting the exponential term $Ak^{-x}$ into a linear term $x$, the latter serving as an output, and as a feedback signal for generating the linear term $Bx$ for subtraction from the input $y_{in}$.

Another object of this invention is to provide a method and apparatus for converting an input signal $y_{in}=f(x)$ which may be approximated by a power series:

$$y_{in}=f_2^*(x)=\sum A_n x^n$$

into an output signal in the form:

$$y_{out}=g_2(x)\sum B_n x^n$$

by the employment of a closed loop circuit having means to generate the constant $B_n$, $n=o$, and to subtract the same from the input $y_{in}$, a feedback loop to generate each variable $x^n$ and to multiply the same by the associated coefficient $A_n$, means to subtract each term $A_n x^n$ from the input $y_{in}$ except the linear term $A_1 x$, the latter serving as the input to the feedback loop and means for multiplying each variable $x^n$ by the associated coefficient $B_n$ and for combining the resulting products to generate the output signal $y_{out}=g(x)$.

The exact nature of the present invention, as well as other objects and advantages thereof will become apparent from consideration of the following detailed description, and the accompanying drawing in which:

FIG. 1 is a generalized block diagram of a continuous function generator in accordance with the invention;

FIG. 2 is a specific block diagram of a continuous function generator in accordance with one embodiment of the invention for approximating an input function by an equation in the form of:

$$y_{in}=f_1^-=AK^{-x}+B+C$$

Figure 3:
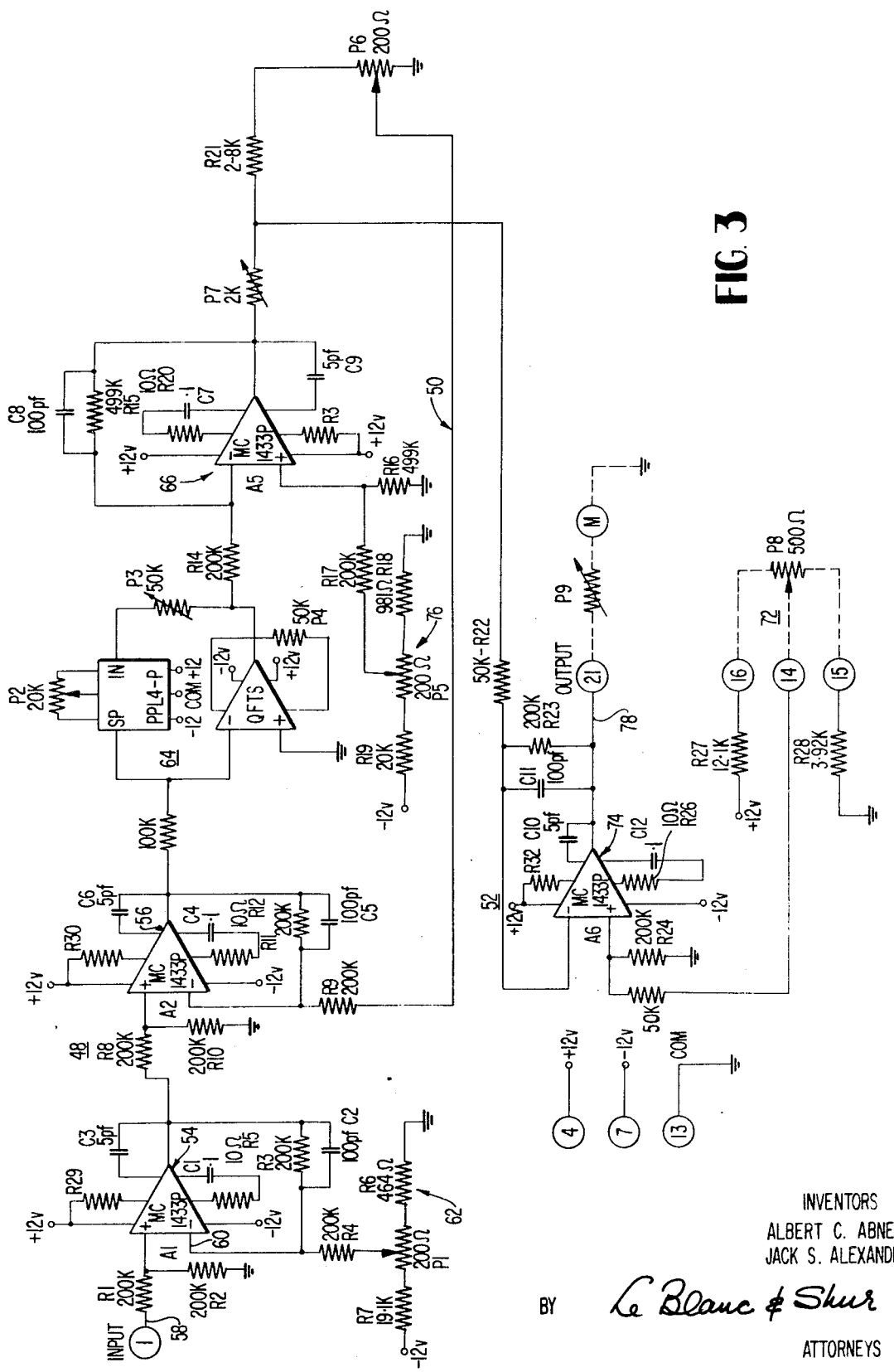

FIG. 3 is a detailed circuit diagram of the continuous function generator of FIG. 2; and FIG. 4 is a block diagram of a continuous function generator in accordance with another embodiment of the invention for converting an input function $y_{in}=f(x)$ into an output function $y_{out}=g(x)$ in power series form.

DETAILED DESCRIPTION OF THE INVENTION

As previously pointed out, the present invention deals with a method and apparatus for converting an electrical input signal $y_{in}$ which is a function of an independent variable $x$, i.e., $y_{in}=f(x)$ into an output signal $y_{out}$ which is a different function of the independent variable $x$, i.e., $y_{out}=g(x)$. In accordance with the present invention, the desired function transformation is achieved by employment of a closed loop signal processor having a forward path and one or more feedback paths.

A generalized version of such a closed loop signal processor is illustrated in FIG. 1. Here, the closed loop processor, generally denoted at 10 includes a forward path 12, a feedback path 14 and an output generating circuit generally denoted as 16. The latter includes a plurality of signal processors 18, 20 and 22 and an output summation element 24 which provides the output signal $y_{out}$ at a terminal 26.

Generally stated, the operation of processor 10 involves representation of the input signal $y_{in}$ by a suitable approximating equation $f^-(x)$ and subtraction from $y_{in}$ of each term in the approximating equation except one term, hereinafter denoted as the remaining or output term. The latter is used to generate each of the terms to be subtracted and to generate part of the output signal $y_{out}$, if necessary.

Accordingly, forward path 12 may be regarded as an algebraic summation element including an additive input 28 for the input signal $y_{in}$, and subtractive inputs, two of which are illustrated at 30 and 32, and which are connected to the feedback path 14 at a pair of outputs 34 and 36. Forward processing path 12 produces an output at 38 which represents the difference between the input signal $y_{in}$ and all but the designated remaining term of the approximating function $f^-(x)$. Thus, assuming that the function $f^-$ is a satisfactory approximation to the input signal $y_{in}=f(x)$, then the signal appearing at output 38 of forward path 12 will be very close in value to the remaining term.

Feedback processing path 14 converts the remaining term provided at output 38 of forward processing path 12 into the required terms of the approximating function $f^-(x)$. Thus, output 38 of forward processing path 12 is connected to an input 40 of feedback processing path 14. The resulting outputs 34 and 36 are connected respectively to the subtractive inputs 30 and 32 of forward processing path 12, to complete the loop processor 10 as previously explained.

The output signal $Y_{out}=g(x)$ is produced by collection and appropriate further processing of the remaining terms and other terms of the approximating function generated by feedback processing path 14. Accordingly, output 38 of forward processing path 12 is connected through signal processor 18 to summation element 24 while the outputs 34 and 36 from feedback processing path 14 are connected to summation circuit 24 through signal processors 20 and 22. Signal processors 18-22 modify the respective inputs appropriately (as by multiplication by a constant) to construct the output signal $Y_{out}$ in the desired form.

A functional diagram of one particular embodiment of closed loop processor 10 is shown in FIG. 2. The embodiment illustrated here is a curve straightener or linearizer which operates to transform an input dependent variable $y_{in}=f(x)$ into a simple linear equation in the form:

$$y_{out}=g(x)=mx+b$$

As illustrated in FIG. 2, the curve straightener, denoted generally at 46 includes a forward processing path 48, a feedback processing path 50, and an output processing path 52, corresponding to those portions of FIG. 1 denoted 12, 14 and 16 respectively. Forward path 48 includes a series connection of a first summing amplifier 54 and a second summing amplifier 56. The input signal $Y_{in}$ is connected to a positive input 58 of summing amplifier 54. A negative input 60 to amplifier 54 is provided by an adjustable constant signal source 62.

Forward processing path 48 is comprised of a logarithmic function generator or "log element" 64, a third summing amplifier 66 and a coefficient multiplier 68 which provides a selected value of gain as explained hereinafter. Output processing path 52 includes a coefficient multiplier 70 connected to the output of summing amplifier 66 and an adjustable constant signal source 72 both connected as inputs to a summing amplifier 74. The latter provides the output signal in the desired form:

$$Y_{out}=g(x)=mx+b.$$

Operation of function linearizer 46 is based on successful approximation of an input function $Y_{in}=f(x)$ by the equation:

$$Y_{in}=f_1^=(x)=AK^{-x}+Bx+C \quad (4)$$

The technique of term generation and elimination described above is employed to eliminate all of the terms of equation (4) except the exponential term $AK^{-x}$. The latter is used to generate a signal representative of the independent variable $x$ which in turn is used to generate the terms $Bx$ and $mx$ for term elimination and output signal construction respectively.

Specifically, the constant term $C$ in equation (4) is eliminated by subtracting the signal provided by signal source 62 from the input $y_{in}$ by means of first summing amplifier 54. [The appropriate values for the constant $C$, and in fact, for the constants $A$, $K$, and $B$ as well may be determined by measurement of the input function $y_{in}$ for four different values of the independent variable $x$ and solution of the resulting set of four simultaneous equations as explained above, or by graphical or other methods.]

Upon subtraction of the signal representing the constant term $C$ from the input function, the output of first summing amplifier 54, which serves as the positive input to second summing amplifier 56 is representative of a function:

$$y'=AK^{-x}+Bx \quad (7)$$

The next step in the successive termwise elimination involves removal of the linear term $Bx$ in equations (4) or (7). To derive the linear term, however, it is necessary to convert the assumed remaining term $AK^{-x}$ into linear form. This is accomplished by employment of "log element" 64 and third summation amplifier 66. For an input $v$, "log element" 64 provides an output $y''$ in the form:

$$y'' = \log_{10}(V/10) \quad (8)$$

Thus, assuming that the input $v$ to "log element" 64 is in the form $AK^{-x}$, the resultant output will be:

$$y'' = \log_{10}A - X\log_{10}(K) - 1 \quad (9)$$

Equation (9) may be readily converted into linear function $x$ by removing the constant $[\log_{10}A-1]$. This is accomplished by connecting the output of "log element" 64 to the negative input of third summing amplifier 66, and a constant signal source 76 set to the value $[\log_{10}A-1]$ to the positive input of summing amplifier 64. If amplifier 66 is adjusted to have unit gain, then the resulting output would be $x\log_{10}(K)$. To obtain the linear term with a unity coefficient, it is only necessary to provide a gain for amplifier 66 equal to $1/\log_{10}K$.

The resulting independent variable $x$ is fed through amplifier 68 to produce the linear term $Bx$. This is coupled to the negative input of amplifier 56 to complete the closed loop and to subtract the linear term from the input $Y_{in}$, thereby producing the assumed remaining term $AK^{-x}$. Also, the independent variable $x$ is connected as an input to the coefficient multiplier 70 in output processing path 52. Coefficient multiplier 70 is set to the desired coefficient $m$, and adjustable constant signal source 72 is set to the desired value $b$. The resulting signals are summed by fourth summing amplifier 74 to provide the desired output at 78 in the form:

$$Y_{out}=mx+b.$$

Linearizer 46 may also be employed in several other ways. These include providing an output from the circuit at the output of second summing amplifier 56 whereby the input function $y_{in}$ is transformed into an output function in exponential form. Other signal processing techniques involving multiplication, division, etc., may also be employed to create output functions in a wide variety of desired forms using the basic circuit configuration just described.

A detailed diagram of the circuit described functionally in connection with FIG. 2 is shown in FIG. 3. As illustrated, the circuit is comprised of a number of commercially available integrated circuit units interconnected to provide the desired operating functions.

Specifically, summing amplifiers 54, 56, 68 and 74 comprise high-gain operational amplifiers such as model MC 1433P manufactured by Motorola Semi-Conductor Products, Inc., Phoenix, Arizona. "Log element" 64 is comprised of a logarithmic amplifier such as Philbrick model PPL4-P connected in the feedback path of an ultrastable operational amplifier such as the Philbrick QFT-5. The latter are available from Philbrick Researches, Inc. of Dedham, Mass.

Operation of these units per se does not constitute part of the invention, and, in the interest of brevity, detailed description of the circuit operation will be omitted.

With reference to FIG. 3, (wherein corresponding portions bear the same reference numerals as in FIG. 2) the input dependent variable $y_{in}$ is provided at the positive input 58 summing amplifier 54. A voltage divider including fixed resistors R4, R6 and R7 and potentiometer P1 forms signal source 62. This provides the additive constant $C$ to the negative input 60 of amplifier 54. The output of summing amplifier 54 therefore represents equation (7), i.e., $$y'=AK^{-x}+Bx$$

The output of amplifier 54 is connected to amplifier 56 which serves to remove the linear form $Bx$ of equation (4) from the input signal $y_{in}$ to produce the remaining term $AK^{-x}$. The latter, in turn is used to generate the independent variable $x$ as now described.

Particularly, the conversion of the signal $AK^{-x}$ into the signal $x$ is accomplished by use of logarithmic amplifier PPL4-P and operational amplifier QFT-5. These operate to convert the output of amplifier 56 into an inverse logarithmic function equivalent to:

$$y'' = \log_{10}(v/10) = \log_{10}A - X\log_{10}(K) - 1 \quad (9)$$

The signal analog $y''$ is connected through coupler resistor R14 to the negative input of summing amplifier 66. The positive input is provided by adjustable constant signal source 76 which comprises a voltage divider including fixed resistors R16, R17, R18 and R19 and potentiometer P5. As explained hereinafter the gain of amplifier 66 is set at some convenient value $G$, such as 10 whereby the output signal at terminal 11 is in the form $$Gx/\log_{10}K$$

This signal is employed to generate both the feedback signal $Bx$ and the output term $mx$.

The feedback signal $Bx$ is generated by a voltage divider including fixed resistor R21 and potentiometers P6 and P7. Note that for the embodiment of FIG. 3 the coefficient $B$ is provided by passive resistive elements; no amplification is provided. The need for such amplification is avoided since amplifier 66 may be provided with a gain $G/\log_{10}K$ of any desired value. From comparison of FIGS. 2 and 3, it may be seen that providing amplifier 66 with a gain other then $1/\log_{10}K$ introduces no difficulties since the value of constant multiplier 70 may be adjusted accordingly to provide the desired coefficient for the linear output term $mx$.

Referring again to FIG. 3, linear term $mx$ is generated by potentiometer P7 and fixed resistor R22 which are coupled to the negative input of summing amplifier 74. Any desired additive term $b$ is provided by adjustable constant source 72 comprised of a voltage divider including fixed resistors R24, R25, R27 and R28, and potentiometer P8. The resulting output at terminal 78 of summing amplifier 74 represents the desired linear output function $$Y_{out} = mx + b.$$

A second embodiment in accordance with the present invention comprises apparatus for converting an input dependent variable $y_{in}$ which may be approximated by power series in the form:

$$y_{in} = f_2^* = \sum A_n x^n \quad (5)$$

into an output dependent variable $Y_{out}$ in the form:

$$y_{out} = g_2(x) = \sum B_n x^n \quad (6)$$

Such a function generator is shown in FIG. 4 and generally denoted 80. By way of example, function generator 80 has been set up to transform an input dependent variable $Y_{in}$ approximated by a power series:

$$Y_{in} = Ax^7 + Bx^6 + Cx^5 + Dx^4 + Ex^3 + Fx^2 + Gx + H \quad (10)$$

into an output dependent variable $Y_{out}$ in the form:

$$Y_{out} = Qx^7 + Rx^6 + Sx^5 + Tx^4 + Ux^3 + Vx^2 + Wx + Z \quad (11)$$

The illustrated apparatus comprises a forward processing path 82 a feedback path 84 and an output function generating path 86. Forward processing path 82 comprises a plurality of summing amplifiers denoted 88a through 88g, one less than the number of terms in the power series by which $Y_{in}$ is to be approximated. (Actually, a single summing amplifier could be used, but the large number of terms in equation (1) makes the use of several two-input amplifiers a more practical arrangement.) Input dependent variable $Y_{in}$ is connected to the positive input of summing amplifier 88a while the output of summing amplifier 88a is connected to the positive input of the next succeeding amplifier 88b. Similarly, the output of amplifier 88b is connected to the positive input of summing amplifier 88c and so on through amplifier 88g. The output of amplifier 88g which represents the remaining term, in this instance, linear term $Gx$, provides the input to the feedback path 84.

Since function generator 80 operates in terms of a power series, the herein disclosed technique of termwise elimination requires the generation of a series of feedback analog signals one of which is proportional to each power of the independent variable appearing in the approximating equation. These terms are provided by multiplication of preceding terms by the independent variable $x$ followed by multiplication by the required numerical coefficient.

Accordingly, feedback processing path 84 includes a plurality of electronic multipliers 90a through 90f and a plurality of associated coefficient multipliers 92a through 92f. The remaining term in equation (10), i.e., the term $Gx$ is coupled through a coefficient multiplier 94 set to a value of $1/G$ to provide a signal analog of the independent variable $x$ on a common feedback input line 96.

Each of the multipliers 90a through 90f is provided with two inputs and an output. The two inputs of multiplier 90f are both connected to feedback input line 96 whereby the multiplier output at terminal 98f is a signal representative of the quantity $x^2$. Output 98f of multiplier 90f is connected to one input of multiplier 90e. The other input is provided from feedback input line 96 whereby the output of multiplier 90e on lead 98e is a signal representative of the quantity $x^3$. Likewise, output 98e of multiplier 90e is connected to one input of multiplier 90d while the second input is provided from feedback input line 96, and so on for each of the remaining multipliers whereby output 98a is a signal representative of the quantity $x^7$, output 98b is a signal representative of the quantity $x^6$, output 98c of multiplier 90c is a signal representative of the quantity $x^5$, and output 98d of multiplier 90d is a signal representative of the quantity $x^4$.

Outputs 98a through 98f of multipliers 90a through 90f are connected through one of the coefficient multipliers 92a through 92f to the negative inputs of respective ones of summing amplifiers 88b through 88g. Coefficient multipliers 92a through 92f are respectively set to provide multiplication by the coefficient $A$ through $F$. The output of coefficient of multiplier 92a is connected to the negative input of summing amplifier 88b to subtract term $Ax^7$ from the input $Y_{in}$. Correspondingly, the output of coefficient multiplier 92b is connected to the negative input of summing amplifier 88c, to subtract the term $Bx^6$ from the input $Y_{in}$. Each of the terms $Cx^5$, $Dx^4$, $Ex^3$, and $Fx^2$ is likewise generated by one of coefficient multipliers 92c through 92f and is subtracted by one of amplifiers 88c through 88f. The constant term $H$ in equation 11 is eliminated by subtraction of a constant voltage from the input dependent variable $Y_{in}$ by means of a constant signal source 100 connected to the negative input of first summing amplifier 88a.

The result of the foregoing is a successive elimination of each term in the approximating equation except for the designated remaining term, the latter being employed to generate the terms for subtraction.

The purpose of output function generating path 86 is to appropriately scale each variable in the power series approximation of the input dependent variable $Y_{in}$ and collect the terms into a single output signal. Thus, output processing path 86 includes a plurality of coefficient multipliers 102a through 102g, appropriately set to the values of the coefficients $Z$ through $W$ in equation (11), an adjustable constant input source 104, representing the constant $Z$ in equation (11), and an output summing amplifier 106 which provides the output dependent variable $Y_{out}$ at the terminal 108.

Coefficient multipliers 102a through 102f are connected respectively to the outputs 92a through 92f of two input multipliers 90a through 90f to produce the terms $Qx^7$, $Bx^6$, $Sx^5$, etc. Coefficient multiplier 102g is connected to the output of coefficient multiplier 94, i.e., in common with the input to feedback path input line 96 to produce the term $Wx$.

The outputs of all of coefficient multipliers 102a through 102g and adjustable constant signal source 104 are connected to summing inputs of summing amplifier 106 to provide the summation of all of the terms in the equation characterizing the dependent output variable $Y_{out}$. The result is conversion of an input variable $Y_{in}$ approximated by a power series in the form of equation (10) into an output variable $Y_{out}$ characterized by a different power series in the form of equation (11).

As will be appreciated, the number of higher order terms necessary to achieve an accurate power series approximation of the input function will depend on the particular form of the input function. Thus, for a particular function, it may not be necessary to provide all of the higher order terms provided by function generator 80. Likewise, the output function being generated may require less than the number of terms appearing in the input approximating equation. Function generator 80 easily meets either requirement.

Thus, the function generator shown in FIG. 4 may readily be employed to convert an input signal $Y_{in}=e^x$ into any output having power series expansion such as an output signal $Y_{out} = \log_e x$, etc. Conversion from exponential to trigonometric functions may likewise be achieved although the number of terms in the power series expansion of the trigonometric function necessary to provide the desired accuracy may become excessively large. Likewise, Maclaurin series expansion, or more generally, Taylor series expansions may be employed as input approximating functions if the derivative coefficients are known for the desired number of the higher order terms.

A consideration of the importance with respect to both the power series function generator embodiment of FIG. 4, and the linearizer embodiment of FIGS. 2 and 3 is that best results are achieved if the term chosen as the remaining term is large compared to the other terms. As a practical matter, this requires that for the embodiment of FIG. 4, the coefficient $G$ must not be very small compared to the other coefficients $A$ through $F$. However, if it is known that the coefficient of the linear term is very small, but that the coefficient of some other term is of more satisfactory amplitude, then this information can be taken into account and the large term employed as the remaining term.

For example, if the linear coefficient $G$ in equation (10) is small, but if the coefficient $D$ for the fourth order term is large, then instead of eliminating all terms but the linear term, all terms except the fourth order term are eliminated. This term may then be divided by $D$ and the fourth root extracted to obtain the independent variable $x$ for insertion into the feedback processing path 84.

In actuality, precisely the latter result is achieved by the circuit shown in FIG. 2. Here the linear term $Bx$ is eliminated from the approximating equation by means of summing amplifier 56. The remaining term is the exponential term $AK^{-x}$. This is processed by means of "log element" 64 and summing amplifier 66 in feedback path 50 to recover the independent variable $x$ for multiplication by the coefficient $B$, and subtraction from the input $Y_{in}$.

In the foregoing, there has been described a general method and apparatus for analog function transformations as well as specific method and apparatus embodiments for function linearization and power series synthesis. As will be appreciated, the circuitry shown is readily adjustable to provide many members of a family of functions for representation of an output dependent variable, and for generation of particular output functions totally independent of the need for piecewise linear approximation.

What is claimed and desired to be secured by United States Letters Patent is:

1. Apparatus for transforming an input signal $Y_{in}=f(x)$ into an output signal $Y_{out}=g(x)$, said input signal $Y_{in}$ being capable of approximation by a function $f^*(x)$ having at least two terms which are functions of said independent variable $x$ comprising; input circuit means for receiving said input signal $Y_{in}$; first and second signal processing means; said first signal processing means having a first input connected to said input circuit means; said first signal processing means having additional input means connected to respective output means of said second signal processing means; said second signal processing means having an input connected to an output of said first signal processing means; said second signal processing means including means responsive to a predetermined term of the independent variable $x$ provided at said input to generate signals representing all of the terms of said function $f^*(x)$ including said independent variable except for a designated remaining term; said first signal processing means including signal source means to generate signals representing constant terms of said function $f^*(x)$, subtraction means coupled to said signal source means and to said additional input means to subtract said signals representing said constant terms, and said signals generated by said second processing means from the input signal $Y_{in}$ thereby yielding a signal representing said designated remaining term at the output of said first signal processing means; and further means coupled to the output of said first signal processing means to generate the desired output signal $Y_{out}$.

2. Apparatus as defined in claim 1 wherein said approximating function $f^*(x)$ is in the form:
$$f^*(x)=AK^{-x}+Bx+C$$
wherein said designated remaining term is the exponential term $AK^{-x}$; wherein said signal source means includes means to generate a signal representing the constant $C$, for subtraction from the input signal $Y_{in}$; and wherein said second signal processing means includes converter means responsive to a signal representing said exponential term $AK^{-x}$ appearing at the output of said first signal processing means to generate a signal representing the linear term $Bx$; said first signal processing means further including means to subtract said signal representing the linear term $Bx$ from said input signal $Y_{in}$, whereby the output of said first signal processing means is representative of the exponential term $AK^{-x}$.

3. Apparatus as defined in claim 2 wherein said converter means comprises logarithmic circuit means responsive to an input signal $v$ to generate an output signal representative of the quantity $\log_{10} v/10$ whereby the output of said logarithmic circuit means is a signal representative of the quantity:
$$\log_{10}[AK^{-x}] = \log_{10}A - X\log_{10}(K) - 1$$
means connected to said logarithmic circuit means to generate an intermediate signal $x\log_{10}K$, and means to adjust the numerical coefficient $\log_{10}K$ of said intermediate signal to the value $B$.

4. Apparatus as defined in claim 3 wherein the desired output signal $Y_{out}$ is in the form:
$$Y_{out}=mx+b$$
and wherein said means for generating said desired output signal comprises further means coupled said intermediate signal generating means to adjust the numerical coefficient of said intermediate signal to produce a signal representative of the quantity $mx$.

5. Apparatus as defined in claim 4 wherein said means for generating the desired output signal $Y_{out}$ further includes means coupled to said further adjusting means for adding a signal representative of the quantity $b$ to the signal representative of the quantity $mx$.

6. Apparatus as defined in claim 1 wherein said function $f^*(x)$ is in the form:
$$f^*(x) = \sum_{n=0}^{r} A_n x^n$$

wherein said designated remainder term is a linear term $A_1 x$; wherein said signal source means includes means to generate a signal representative of the zero order term $A_o x^0 = A_o$, for subtraction from the input signal $Y_{in}$; and wherein said second signal processing means includes converter means responsive to a signal representing said linear term $A_1 x$ appearing at the output of said first signal processing means to generate a plurality of signals, each representing one of the higher order terms $A_n x^n$ for $2 < n$ $r$; said first signal processing means further including means to subtract said sequence of signals from said input signal whereby the output of said signal processing means is representative of the linear term $A_1 x$.

7. Apparatus as defined in claim 6 wherein said converter means comprises means responsive to the signal representing said linear term $A_1 x$ to generate a signal representing the quantity $x$ and to present the same on a signal distribution path; a series ($r-2$) multipliers each having an input and an output, said multipliers being arranged in series relationship with the output of one multiplier being connected to the input of the next multiplier, and with the input of said first multiplier being connected to said signal distribution path; each of said multipliers having a further input connected in common to said signal distribution path whereby the output of the first multiplier is a signal representing the quantity $x^2$, the output of the second multiplier is a signal representing the quantity $x^3$, etc., the output of the last multiplier being a signal representative of the quantity $x^r$; a series of $(r-2)$ further signal processing means each connected to the output of one of said multipliers to generate the respective coefficient $A_n$ for each of the terms $x^n$, for $2 \leq n \leq r$; and means for connecting said further signal processing means to said first signal processing means for subtraction of said sequence of signals from said input signal $Y_{in}$.

8. Apparatus as defined in claim 7 wherein said further signal processing means comprise means to adjust the amplitude of said signals corresponding to the quantities $x^n$, $2 \leq n \leq r$.

9. Apparatus as defined in claim 8 wherein the desired output signal $Y_{out}$ is in the form $$Y_{out} = \sum_{n=0}^{p} B_n x^n$$

and wherein said means for generating said output signal comprises a series of $(p)$ additional signal processors, connected to at least some of the multipliers to adjust the amplitudes of the signals representing the quantities $x^n$, $2 \leq n \leq r$ in accordance with the respective coefficient $B_n$; and means coupling outputs of the additional signal processors together to produce the signal $Y_{out}$.

10. Apparatus as defined in claim 9 wherein one of said additional signal processors is connected to the signal distribution path.

11. Apparatus as defined in claim 10 further including means connected to said output coupling means to add a constant level to said output signal representing a quantity $B_0 x^0$.

12. A method for transforming an electrical input signal $Y_{in}=f(x)$ into an electrical output signal $Y_{out}=g(x)$, said input signal $Y_{in}$ being capable of approximation by a function $f^*(x)$ having at least two terms which are functions of said independent variable $x$ comprising:

generating a first electrical signal representative of any constant term in said function $f^*(x)$; subtracting said constant term signal from said input signal $Y_{in}$; generating a further signal for each of the terms of said function $f^*(x)$ including the independent variable except for a designated remaining term; subtracting said one or more further signals from said input signal, to produce a signal representing said designated remaining term; the latter being employed in generating said one or more further signals by conversion thereof into said signals representing the required functions of said independent variable, and electrically processing said further signals to generate the desired output signal $Y_{out}$.

13. A method as set forth in claim 12 wherein said further $f^*(x)$ is in the form $$f^*(x) = AK^{-x} + Bx + C;$$

wherein said designated remaining term is the exponential term $AK^{-x}$; and wherein the step of conversion of the signal representing said remaining term comprises processing said signal by means of a logarithmic circuit element to produce a first intermediate signal in the form:

$$\log_{10}(A) - x\log_{10}(K) - 1;$$

subtracting from said first intermediate signal another signal in the form $$\log_{10}(A) - 1,$$

thereby yielding a second intermediate signal in the form $$x\log_{10}(K);$$

and adjusting the amplitude of said second intermediate signal to produce a signal representing the quantity $Bx$.

14. A method as set forth in claim 13 wherein said output signal is in the form $$Y_{out} = mx + b; \ |b| \geq 0$$

and wherein said step of electrically processing said further signals comprises adjusting the amplitude of said second intermediate signal to produce a signal representing the quantity $mx$; and further including the step of adding a signal representing the quantity $b$ to the signal representing the quantity $mx$.

15. A method as set forth in claim 12 wherein said function $f^*(x)$ is in the form $$\sum_{n=0}^{r} A_n x^x$$

wherein said designated remaining term is the linear term $A_1 x$; and wherein the step of conversion of the signal representing said remaining term comprises adjusting the amplitude of said linear term to produce a first intermediate signal representing the quantity $x$; processing said first intermediate signal to generate a sequence of further intermediate signals $x^2, x^3, ... x^r$; and adjusting the n each of said further intermediate signals according to the respective coefficients $A_2, A_3, ... A_r$ to generate said further signals representing the quantities $A_2 x^2$, $A_3 x^3 ... A_r x^r$.

16. A method as set forth in claim 15 wherein said output signal is in the form:

$$Y_{out} = \sum_{n=0}^{p} B_n x^n$$

and wherein said step of electrically processing said further signals comprises adjusting the amplitude of said first intermediate signal and said further intermediate signals to produce signals representing the quantities $B_n x^n$, $1 \leq n \leq p$; generating a signal representing the quantity $B_0 x^0$; and combining said signals representing the quantities $B_n x^n$ $0 \leq n \leq p$ to generate the signal $Y_{out}$.

* * * * *

UNITED STATES PATENT OFFICE
CERTIFICATE OF CORRECTION

Patent No. 3,636,338  Dated January 18, 1972

Inventor(s) Albert C. Abnett and Jack S. Alexander

It is certified that error appears in the above-identified patent and that said Letters Patent are hereby corrected as shown below:

In the Abstract, lines 17 and 20, "feedback" should read --feedback path--.

In Col. 1, line 7, "$y' = (x)$" should read --$y' = g(x)$--; line 16, "$y = f(aj)$" should read --$y = f(x)$--; line 17, "$z = g(a0)$" should read --$z = g(x)$--; line 19, "$y = f(aj)$" should read --$y = f(x)$--.

In Col. 2, line 24, "$2 = g(x)$" should read --$z = g(x)$--; line 33, "$f^=$" should read --$f^*$--;

in line 46, "$f_1^= = AK^{-x} + Bx + C \quad (4)$" should read $$--f_1^* = AK^{-x} + Bx + C \quad (4)--;$$

in line 75, "$y_{in} = f^=$" should read --$y_{in} = f^*$--.

In Col. 3, line 4, "$Y_1 = f^=(X_1),$" should read --$Y_1 = f^*(X_1),$--; in line 42, "$y_{in} = f_1^=(x) = AK^{-x} + Bx + C.$" should read $$--y_{in} = f_1^*(x) = AK^{-x} + Bx + C.--;$$

in line 63, "$y_{in} = f_1^= = AK^{-x} + Bx + C$" should read $$--y_{in} = f_1^* = AK^{-x} + Bx + C--.$$

In Col. 4, line 29, "$y_{in} = f_1^= = AK^{-x} + B + C$" should read  --$y_{in} = f_1^* = AK^{-x} + B + C$--;   ... over

UNITED STATES PATENT OFFICE   Sheet 2.
CERTIFICATE OF CORRECTION

Patent No. 3,636,338                          Dated January 18, 1972

Inventor(s)  Albert C. Abnett and Jack S. Alexander

It is certified that error appears in the above-identified patent and that said Letters Patent are hereby corrected as shown below:

In Col. 4, line 56, "$f^=(x)$" should read --$f^*(x)$--; line 69, "$f^=(x)$" should read --$f^*(x)$--; same line "$f^=$" should read --$f^*$--; line 75 "$f^=(x)$" should read --$f^*(x)$--.

In Col. 5, line 45, "$Y_{in} = f_1^=(x) = AK^{-x} + Bx + C \quad (4)$"

should read    --$Y_{in} = f_1^*(x) = AK^{-x} + Bx + C \quad (4)$--;

line 73, "$y" = \log_{10}(V/10)$" should read --$y" = \log_{10} \frac{V}{10}$--.

In Col. 6, line 66,

"$y" = \log_{10}(v/10) = \log_{10} A - X \log_{10}(K) - 1 \quad (9)$"

should read --$y" = \log_{10} \frac{V}{10} = \log_{10} A - X \log_{10}(K) - 1 \quad (9)$--.

In Col. 7, line 29, "$y_{in} = f_2^* = \sum A_n x^n \quad (5)$"

should read --$y_{in} = f_2^*(x) = \sum A_n x^n \quad (5)$--;

in line 43, "$Y_{out} = QX^7 + Rx^6 + Sx^5 + Tx^4 + Ux^3 + Vx^2 + Wx + Z$"

should read --$Y_{out} = Qx^7 + Rx^6 + Sx^5 + Tx^4 + Ux^3 + Vx^2 + Wx + Z$--

In Col. 8, line 53, "$Bx^6$" should read --$Rx^6$--.

... over

UNITED STATES PATENT OFFICE
CERTIFICATE OF CORRECTION

Patent No. 3,636,338     Dated January 18, 1972

Inventor(s) Albert C. Abnett and Jack S. Alexander

It is certified that error appears in the above-identified patent and that said Letters Patent are hereby corrected as shown below:

In Col. 10, line 62, Claim 6, "$2 < n\ r$" should read $--2 \leq n \leq r--$.

In Col. 11, line 8, Claim 7, "$2\ n\ r$," should read $--2 \leq n \leq r,--$.

In Col. 12, line 37, Claim 15, "the n" should read --the amplitude of--.

Signed and sealed this 11th day of July 1972.

(SEAL)
Attest:

EDWARD M. FLETCHER, JR.
Attesting Officer

ROBERT GOTTSCHALK
Commissioner of Patents